(12) United States Patent
Hundley et al.

(10) Patent No.: US 6,279,203 B1
(45) Date of Patent: Aug. 28, 2001

(54) TWO-PIECE CABLE TIE WITH COINED LOCKING WEDGE

(75) Inventors: Larry E. Hundley, New Lenox; Daniel H. Ureche, Chicago, both of IL (US)

(73) Assignee: Panduit Corp, Tinley Park, IL (US)

( * ) Notice: Subject to any disclaimer, the term of this patent is extended or adjusted under 35 U.S.C. 154(b) by 369 days.

(21) Appl. No.: 08/596,062

(22) Filed: Feb. 6, 1996

(51) Int. Cl.$^7$ ..................................................... B65D 63/00
(52) U.S. Cl. ..................................... 24/16 PB; 24/30.5 P
(58) Field of Search ............................. 24/16 PB, 17 AP, 24/30.5 P

(56) References Cited

U.S. PATENT DOCUMENTS

| | | | |
|---|---|---|---|
| 3,186,047 | * | 6/1965 | Schwester et al. . |
| 3,408,699 | * | 11/1968 | Reynolds . |
| 3,457,598 | | 7/1969 | Mariani . |
| 3,991,444 | * | 11/1976 | Bailey ................................ 24/16 PB |
| 5,146,654 | * | 9/1992 | Caveney et al. ................... 24/16 PB |
| 5,267,373 | * | 12/1993 | Chisek ................................ 24/16 PB |
| 5,440,786 | * | 8/1995 | Sorensen et al. .................. 24/16 PB |

FOREIGN PATENT DOCUMENTS

0662429A1 * 12/1995 (EP) .

* cited by examiner

Primary Examiner—Milton Nelson, Jr.
Assistant Examiner—Stephen Vu
(74) Attorney, Agent, or Firm—Robert A. McCann

(57) ABSTRACT

A two-piece cable tie including a strap and a locking head forming a strap accepting channel with a metal locking wedge positioned within the channel and mounted to the locking head including a groove formed by coining on the embedded end of the metal locking wedge to increase the pull out force of the locking wedge without the need to cut out material of the locking wedge. The coined groove also avoids weakening of the flexure region and still allows for a decrease of the threading force of the cable tie strap.

5 Claims, 3 Drawing Sheets

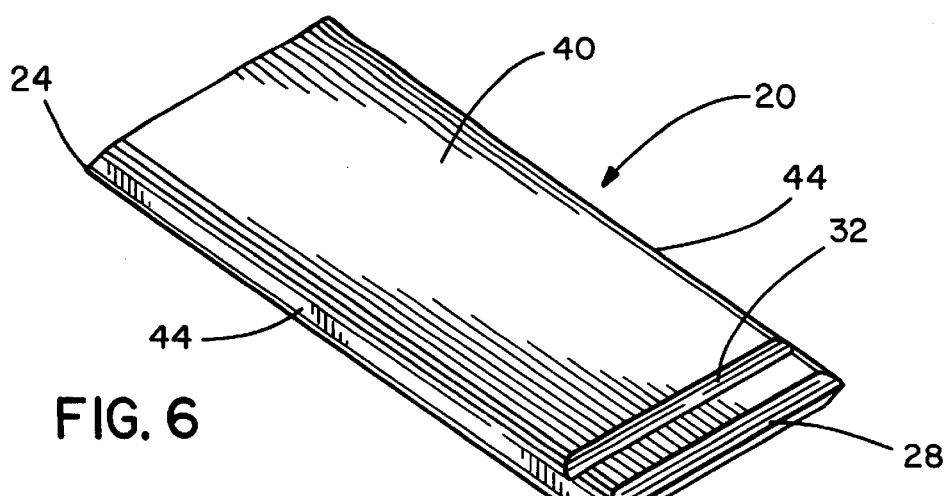
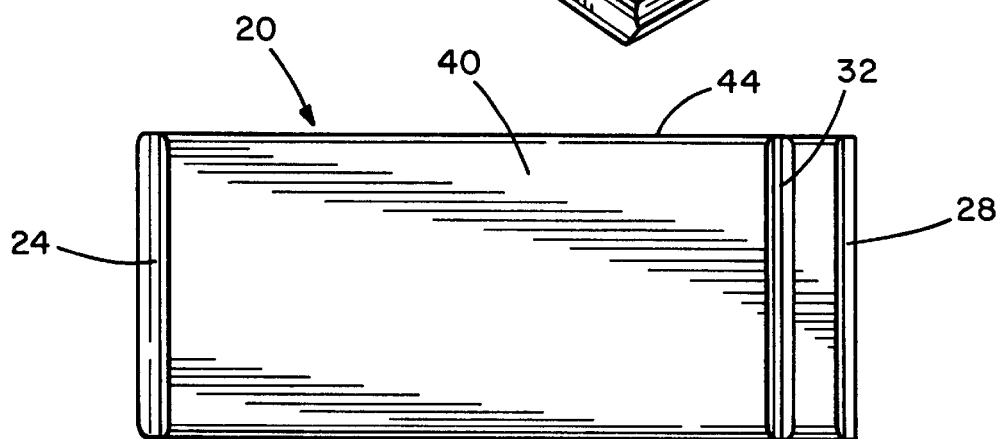
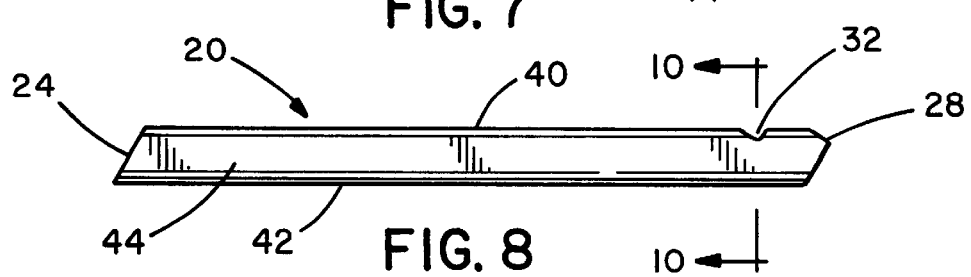
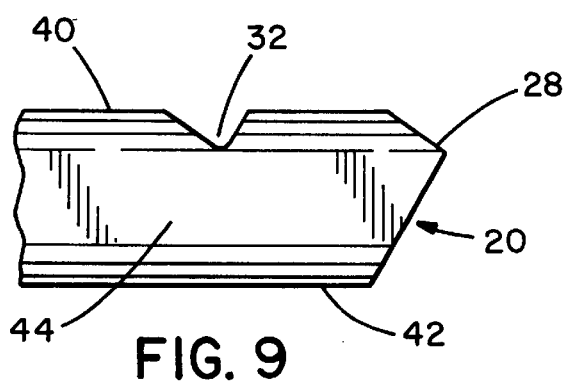
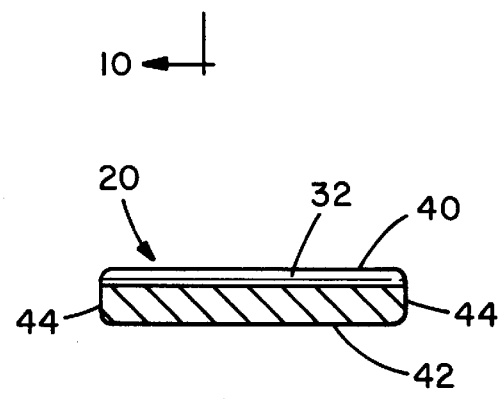

TWO-PIECE CABLE TIE WITH COINED LOCKING WEDGE

TECHNICAL FIELD

The present invention relates generally to a two-piece cable tie of the type having a metal locking wedge inserted into a strap accepting channel formed through a strap locking head which acts as a strap locking mechanism, and more particularly to a two-piece cable tie in which an embedded portion of the metal locking wedge is coined to increase the pull out force of the locking wedge.

BACKGROUND OF THE INVENTION

Cable ties are well known and generally include an elongated strap portion integrally formed with a head having a strap passageway which includes a strap locking mechanism for securing the strap around a bundle of wires or cables. Plastic cable ties having a metal locking wedge inserted within the strap locking channel of the head are well known in the art. U.S. Pat. Nos. 3,186,047 to Schwester, et al. and 3,408,699 to Reynolds are examples of two-piece cable ties utilizing a metal locking wedge. U.S. Pat. No. 3,408,699 teaches weakening the flexure restraining member at its flexure region, which is described as occurring at the contact between the metal locking wedge and the inner wall of the strap locking channel, in order to reduce the threading force of the strap. The additional modifications suggested by U.S. Pat. No. 3,408,699 increase the pull out force of the metal locking wedge by strengthening the flexure restraining member.

While a reduction in threading force and increase in pull out force are desirable, the teachings of Reynolds '699 require cutting out or otherwise removing material from the metal locking wedge which is complicated and involves extra procedures to remove scrap material. Additionally, the weakening of the flexure region of the metal locking wedge by removing material could result in the locking wedge breaking off at this weakened region during strap withdrawal failure that potentially could allow metal pieces to cause problems in the field. Therefore, improvement in the art is still required.

In general, an improved two-piece cable tie includes a strap having a first end and a free end, a locking head secured to the first end of the strap, a plurality of walls on the locking head forming a strap accepting channel, a metal locking wedge having a strap engaging portion positioned within the strap accepting channel and an embedded portion mounted within an inner wall of the locking head and a flexure region disposed therebetween, wherein the metal locking wedge includes a coined groove on the embedded portion of the locking wedge.

SUMMARY OF THE INVENTION

It is, therefore, an object of the present invention to provide an improved two-piece cable tie having an improved metal locking wedge.

It is further an object of the present invention to provide a two-piece cable tie having improved pull out force of the metal locking wedge.

It is still further an object of the present invention to provide a two-piece cable tie requiring a lower force to thread the free strap end.

BRIEF DESCRIPTION OF THE DRAWINGS

FIG. 6 is a perspective view of a metal locking wedge of the present invention;

FIG. 7 is a plan view of the locking wedge of FIG. 6;

FIG. 8 is a side view of the metal locking wedge of FIG. 6;

FIG. 9 is a close up view of the coined groove in the metal locking wedge of FIG. 8; and FIG. 10 is a sectional view of the metal locking wedge taken along lines 10—10 in FIG. 8.

DESCRIPTION OF THE PREFERRED EMBODIMENT

Figure 1:
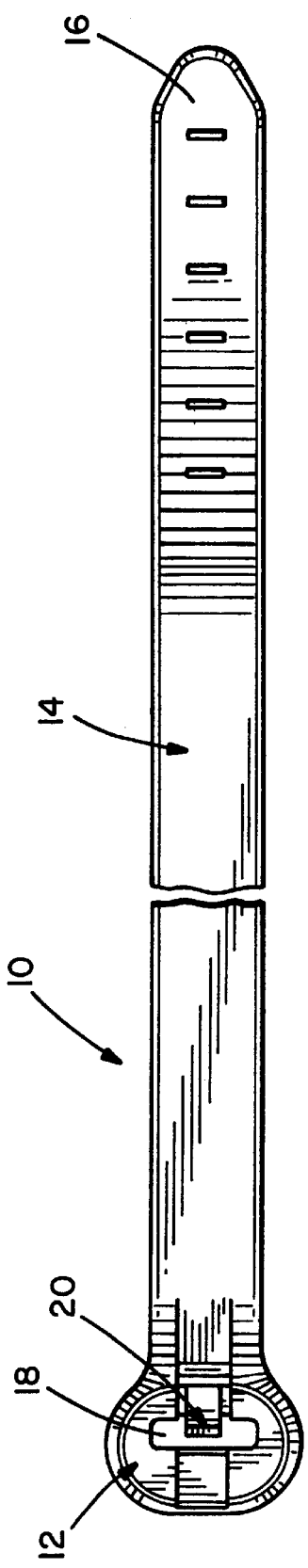
FIG. 1 is a plan view of a cable tie of the present invention.
Figure 2:
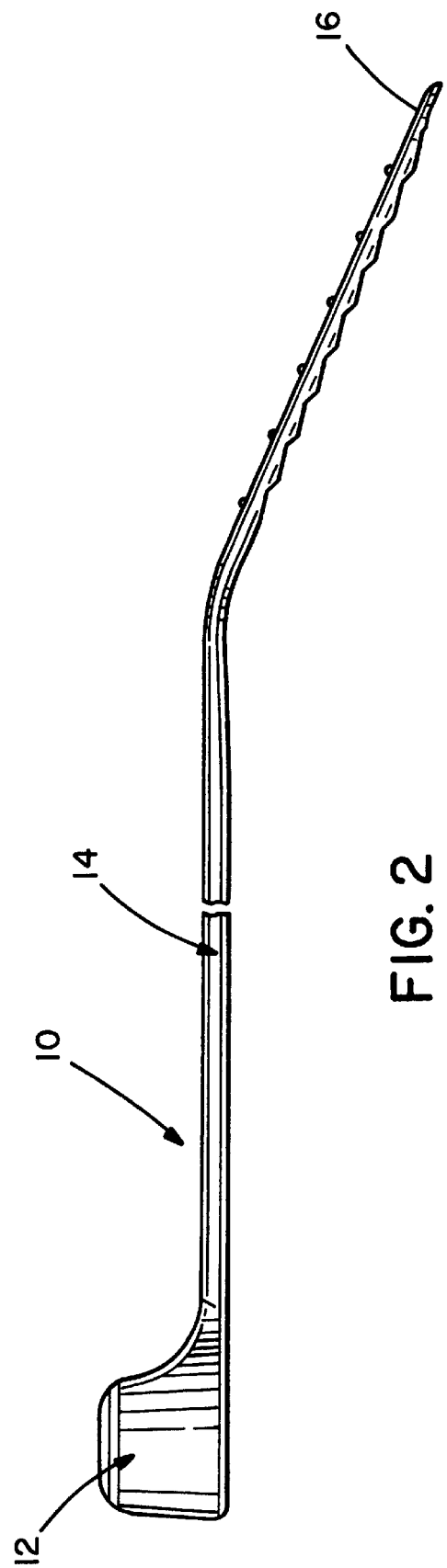
FIG. 2 is a side view of a cable tie of the present invention.
Figure 3:
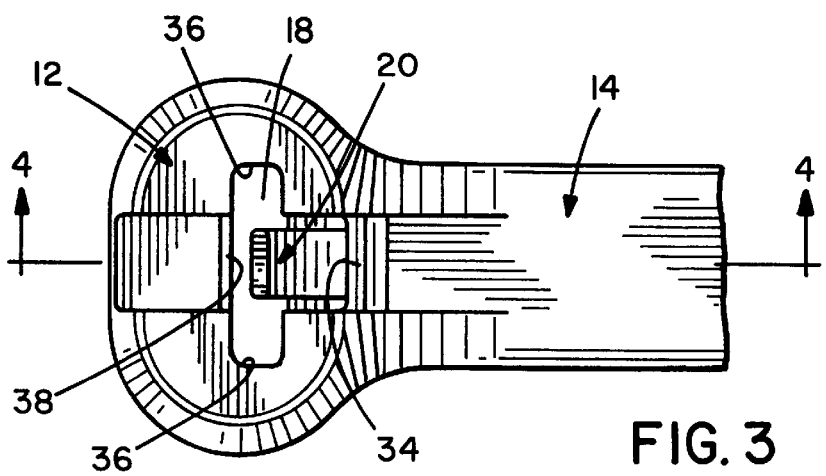
FIG. 3 is a top sectional view of a head end portion of a two piece cable tie.

A cable tie embodying the concept of the present invention is designated generally by the numeral 10 in the accompanying drawings. Cable tie 10 preferably is integrally molded of thermoplastic material. As seen in FIG. 1, cable tie 10 includes a locking head 12 and a strap 14 having a first end secured to locking head 12 and a free end 16 opposite thereto. A strap accepting channel 18 is defined in head 12 by an end wall 38 and an inner wall 34, as well as a pair of sidewalls 36. A metal locking wedge 20 is partially embedded into a recessed area of inner wall 34 of locking head 12 at a preferred angle of 45° to the axis of the strap, such that one end of metal locking wedge 20 is mounted within wall 34 of head 12 and the opposite end of metal locking wedge 20 is disposed within strap accepting channel 18 so locking wedge 20 engages the threaded strap which encircles a bundle (not shown).

Figure 4:
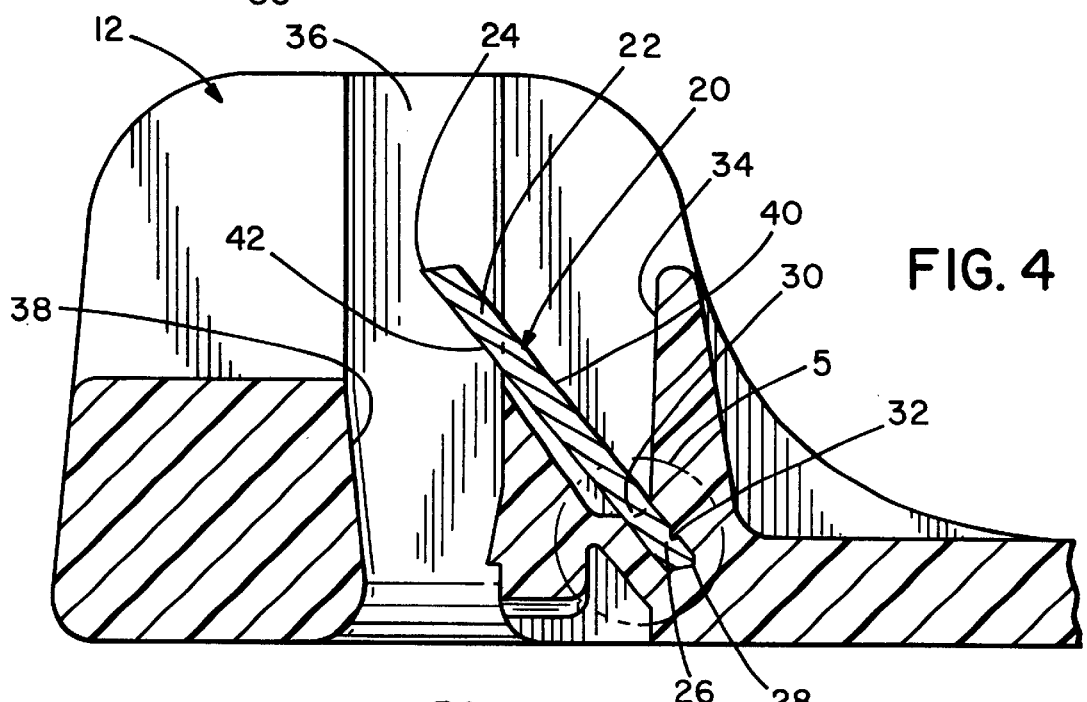
FIG. 4 is a side sectional view of the cable tie of FIG. 3 along lines 4—4.
Figure 5:
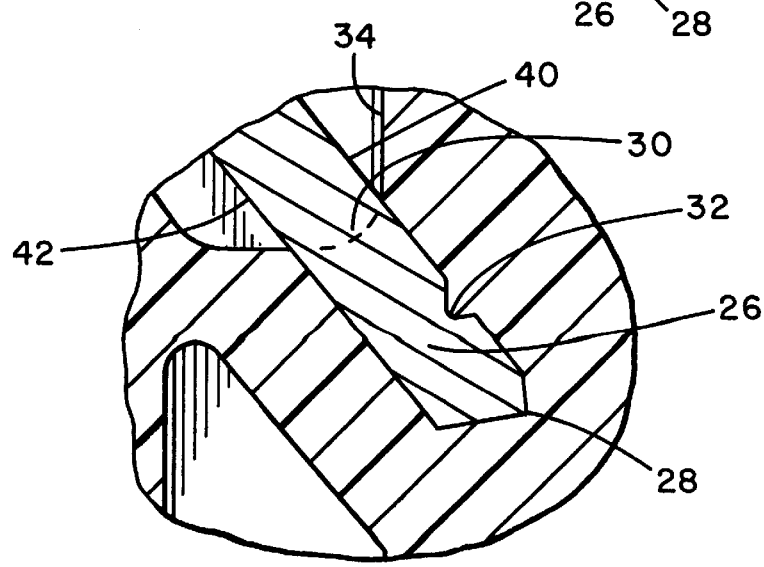
FIG. 5 is a close up view of the mounted end of the metal locking wedge shown in circle 5 of FIG. 4.

As can be seen in FIGS. 6–10, the metal locking wedge has a strap engaging portion 22 with a single beveled strap engaging knife edge 24 at a distal end, and an embedded portion 26 having a double beveled insertion blade edge 28 formed at the opposite distal end. The flexure region 30 of metal locking wedge 20 is disposed between strap engaging portion 22 and embedded portion 26 of locking wedge 22. The flexure region 30 occurs at the point at which locking wedge 20 intersects with inner wall 34. It is the flexure region 30 in conjunction with the angle of the locking wedge 20 which allows the strap 14 to be threaded through strap accepting channel 18 in a first direction but not in a second opposite direction. As best seen in FIG. 4, a bottom surface 42 of the locking wedge faces the strap accepting channel and the top surface 40 is oppositely faced. The locking wedge 20 also includes a groove 32 formed by a coining operation disposed on a top surface 40 solely within the embedded portion 26 of the locking wedge. The coining performed is a standard coining operation using a carbide punch to create groove 32 having a depth of approximately 0.004 inches, whereby during coining, the material of wedge 20 is compressed to form a groove 32 or a depressed area in which no material is removed. Groove 32 has been formed so as to extend from a first lateral side edge 44 to the second lateral side edge 44.

During insertion of the metal locking wedge 20 into the head 12 of cable tie 10, the plastic is such that the plastic will naturally flow into the coined groove 32 and cause interference between the metal locking wedge 20 and the plastic head 12. This interference will greatly increase the pull out force of the metal locking wedge 20 due to the shearing or displacement of the plastic material that flowed into the groove 32 in addition to the frictional force that exists between the metal locking wedge 20 and the plastic head 12. The forming of the groove 32 on the top surface 40 of locking wedge 20 is preferable as the force applied during strap withdrawal has a tendency to rotate locking wedge 20 in a direction that will drive groove 32 into the plastic.

The increase in the pull out force of the locking wedge 20 resulting from the coined groove 32 in the embedded portion 26 allows for improved tolerance of the insertion depths of the locking wedge 20 into the inner wall 34 of head 12. This enables a reduction of the insertion depth of the locking wedge 20 to achieve a reduced strap threading force while maintaining a high pull out force. Additionally, by coining the groove 32 solely on the embedded portion of locking wedge 20, not only are there no pieces of metal which need to be removed during manufacture, there is also no weakening of the locking wedge 20 at the flexure region 30.

While the particular preferred embodiment of the present invention has been shown and described, it will be obvious to those skilled in the art that changes and modifications may be made without departing from the teachings of the invention. The matter set forth in the foregoing description and accompanying drawing is offered by way of illustration only and not as a limitation. The actual scope of the invention is intended to be defined in the following claims when viewed in their proper perspective based on the prior art.

What is claimed is:

1. A cable tie including a strap having a first end and a free end, a locking head secured to the first end of the strap and a plurality of walls on the locking head forming a strap accepting channel, said cable tie comprising:

a metal locking wedge having a strap engaging portion positioned within the strap accepting channel and an embedded portion mounted within an inner wall of the locking head, wherein the metal locking wedge has a first generally flat surface and an oppositely facing second generally flat surface with a plurality of sides therebetween forming the periphery of said locking wedge; and a groove formed in one of the generally flat surfaces on the embedded portion of the metal locking wedge.

2. The cable tie according to claim 1, wherein the groove is disposed on a surface of the locking wedge facing away from the strap accepting channel.

3. The cable tie according to claim 1, wherein the groove extends from a first lateral side edge of the locking wedge to a second lateral side edge of the locking wedge.

4. The cable tie according to claim 1, wherein the groove is disposed solely on the embedded portion.

5. The cable tie according to claim 1, wherein the groove is formed by a coining operation in which no material is removed.

* * * * *